April 11, 1950          J. C. MARIS          2,503,502
LOCOMOTIVE RUNNING GEAR
Filed Oct. 19, 1945          3 Sheets-Sheet 2
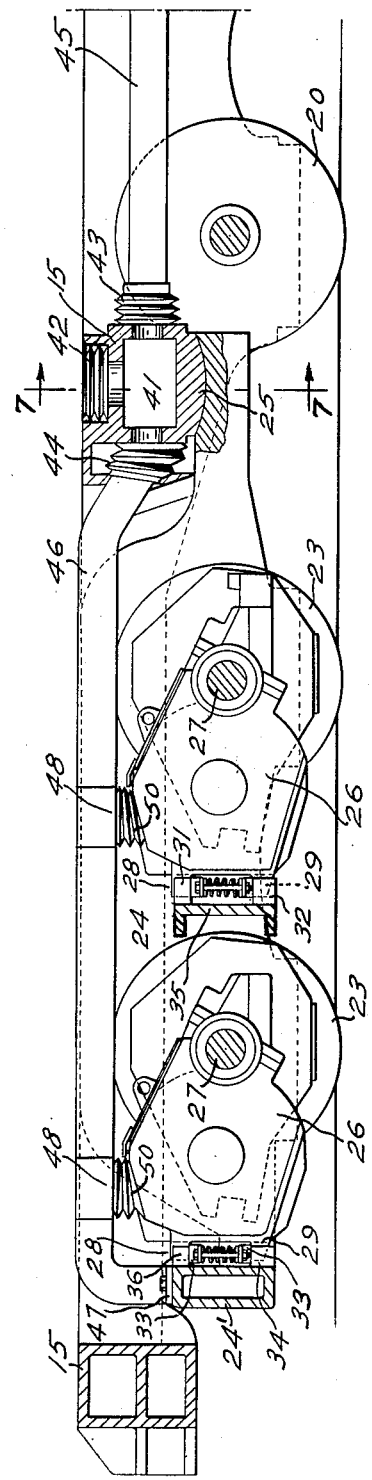
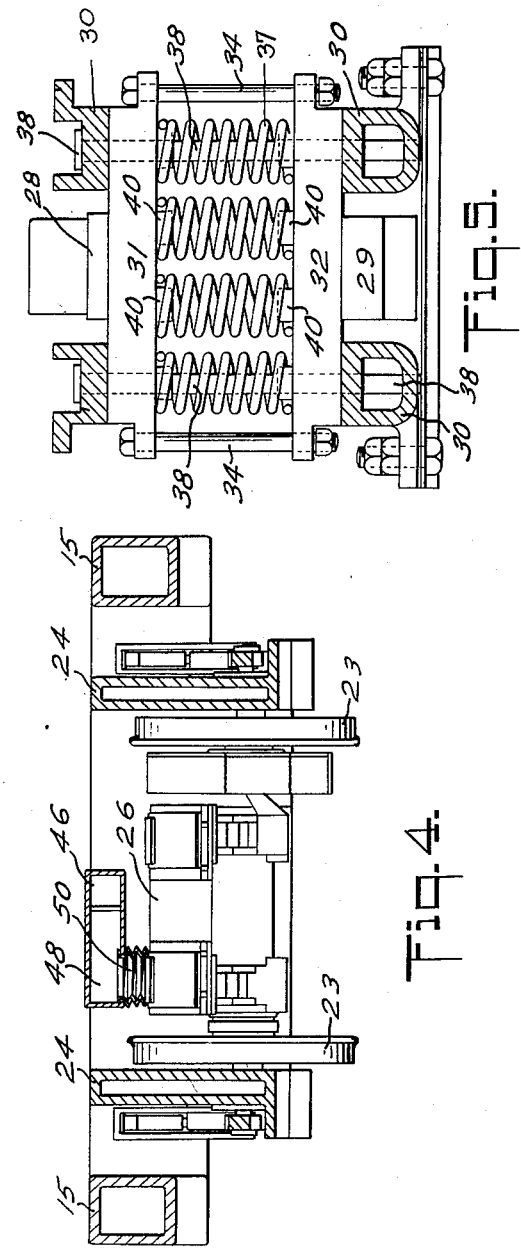
INVENTOR
James C. Maris
BY
ATTORNEY April 11, 1950  J. C. MARIS  2,503,502
LOCOMOTIVE RUNNING GEAR
Filed Oct. 19, 1945  3 Sheets-Sheet 3
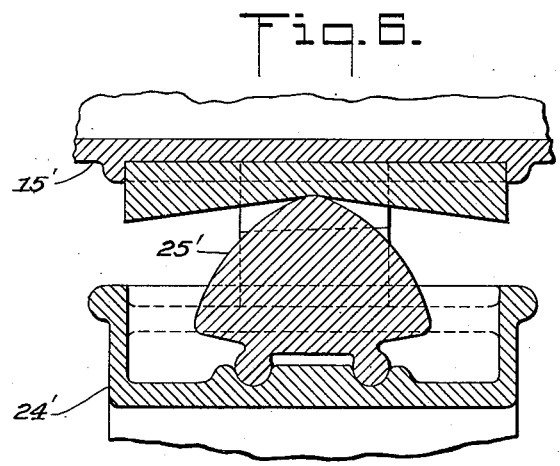
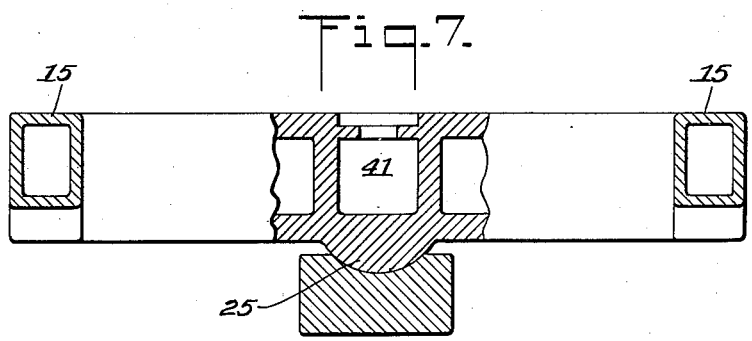
INVENTOR
James C. Maris
BY
ATTORNEY Patented Apr. 11, 1950

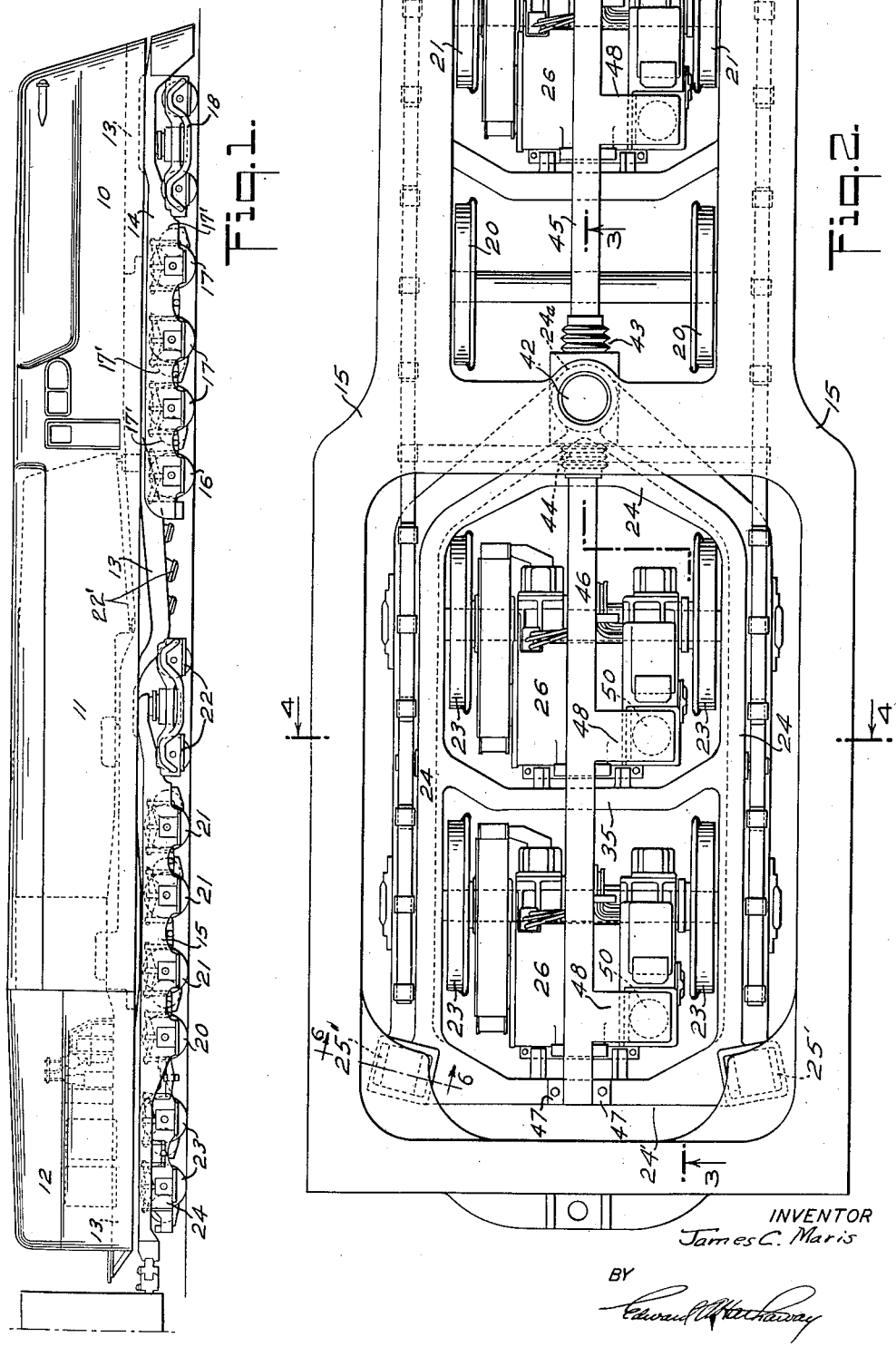

2,503,502

UNITED STATES PATENT OFFICE 2,503,502

LOCOMOTIVE RUNNING GEAR

James C. Maris, Glenolden, Pa., assignor to The Baldwin Locomotive Works, a corporation of Pennsylvania Application October 19, 1945, Serial No. 623,323

3 Claims. (Cl. 105—172)

The present invention relates to steam-electric locomotives, and more particularly to the running gear thereof.

In modern locomotives of the overall cab type in which the cab structure houses, as a single unit, a fuel bunker, steam boiler, steam turbines, and electric generators, a great many serious problems arise from a conflict between, on the one hand, the weight of the locomotive, amount of equipment installed in the structure and the amount of power desired to be generated and transmitted to the wheels, and on the other hand, certain definite limitations as to the dimensions which the locomotive may have. For instance, the length of a locomotive must be kept within limits which will permit it to travel around curves without too much lateral overhanging of the track either at the forward end or at the center of the locomotive. At the same time it is essential to provide a sufficiently flexible wheel arrangement to permit travel around curves and through switches. Also, the width of the locomotive is limited by station platform clearances, bridge abutments, etc. while tunnels limit both width and height. Notwithstanding the foregoing as well as other limitations, it is necessary to provide maximum driving power which, in this particular locomotive, not only requires electric motors for driving the axles but these motors in turn require cooling equipment and ducts for circulating large quantities of cooling air through the motors.

It is an object of my invention to provide an improved combination of truck and motor elements so functionally inter-related as to allow the necessary amount of electric power with cooling thereof while at the same time insuring that the trucks can properly carry the large weight of the cab structure and equipment therein, together with permitting full flexibility of the truck arrangement in passing around curves.

In the accompanying drawings, Fig. 1 represents a side elevation of a locomotive embodying one form of the present invention; Fig. 2 represents an enlarged plan of one of the power truck units of the invention; Fig. 3 represents a section on line 3—3 of Fig. 2; Fig. 4 represents a section on line 4—4 of Fig. 2; Fig. 5 represents a sectional detail on an enlarged scale showing one form of motor suspension; Fig. 6 is a transverse section taken on the line 6—6 of Fig. 2 showing the rocker connection between the power truck and trailer truck frames; and Fig. 7 is a transverse section through the forward pivotal supporting connection between the two truck frames taken on line 7—7 of Fig. 3, parts thereof being omitted for purposes of simplicity.

Referring to the drawings, one form of the present invention is shown as applied to a locomotive of the type shown in my copending application, Serial No. 620,125, filed October 3, 1945. This locomotive is of the elongated cab type formed, Fig. 1, by a fuel bunker unit 10, a steam boiler unit 11, and a steam turbine electric generator unit 12. The aforesaid units are mounted upon a cab underframe 13 which in turn is carried, in this instance, by a front main power truck frame 14 and a rear main power truck frame 15. The frame 14 serves to journal the respective axles of a pair of idler wheels 16, and three pairs of power wheels 17 whose axles are driven by electric motors diagrammatically indicated at 17'. The forward end of frame 14 is pivotally supported on a four wheeled guiding truck 18 and the cab underframe 13 is supported on the main truck frame 14 through a usual centerpin (not shown). The frame 15 serves to journal the respective axles of a pair of idler wheels 20 and three pairs of power driven wheels 21, while the forward end of the frame 15 is pivotally supported on a guiding truck 22. A usual ash pan construction 22' together with a part of the cab underframe 13 projects down between truck 22 and over the unmotorized axle of idler wheels 16 in close proximity to the axle. While I thus sacrifice power for this axle, I am able to provide space for the cab underframe and ash pan as well as for usual sliding supports (not shown) located between the cab underframe and rear end of power frame 14. By providing space in the foregoing manner I am able to partially cope with the problem of keeping down the length of the locomotive even at the expense of aggravating the power problem by sacrificing some very much needed power for the idler axle but which I ultimately make up. Below the turbine-generator unit 12 and to the rear of the pair of idler wheels 20, is an auxiliary power driven delta type trailer truck preferably having two pairs of wheels 23, the frame 24 of which journals the wheels and has its forward tapered end 24a extending into close proximity to the idler wheels 20 and is there connected by a pivotal joint 25, Fig. 3, to the rear main power truck frame 15. This closely coupled relation is rendered possible in my improved combination by employing idler wheels 20 which produce a certain amount of space between the axles in which I project the forward tapered end 24a of the delta truck thereby allowing the delta truck to have its normal pivotal relationship to the main power truck. This close relation aids in coping with the critical problem of keeping down the overall length of the locomotive even at the expense of again aggravating the power problem by sacrificing the very much needed power for the idle axle but which I again ultimately make up. To assure maximum motor capacity notwithstanding the loss of power from the idler wheels 17 and 20, I have utilized the delta truck not only in its cooperative relation to the rear main power frame to shorten the locomotive length but also as a functional part of the power aspect of both the rear and front main power units as by equipping each pair of delta truck wheels 23 with an electric motor 26.

The motors, Figs. 3–5, are flexibly supported at one end upon the axle 27, and at the opposite end by two outwardly disposed, vertically spaced lugs 28 and 29. In order that each motor 26 can be relieved of shocks, I employ the well-known aforesaid lugs 28 and 29 which straddle a shock absorber unit consisting of two transverse spring seats 31 and 32 held by restraining bolts 34. The seats 31 and 32 rest upon upper and lower members 30 which project longitudinally from a unique delta truck construction in the form of a transom 35 formed as an integral rigid part of the truck frame. The two seats 31 and 32 are biased apart by helical springs 37 respectively retained in place by bosses 40 and also by the through bolts 38. These bolts also serve as guides for spring seats 31 and 32. A similar motor mounting is employed for the motor of the rear axle except that an end sill 24', Fig. 3, is used in place of the transom. The motors for all wheels are similarly flexibly supported on springs. The trailer truck is of the delta type so named because the load is transmitted to it at three points, namely, the articulated joint 25, Fig. 3, and well known rocker bearings 25' placed at the two rear corners of the truck frame. The air chamber 41, Fig. 2, to which air is supplied from a suitable blower (not shown) is superimposed on the articulated joint 25.

Thus it is seen that the utilization of idler wheels 16 on the forward main power truck to allow shortening of the locomotive by extending the ash pan over the idle wheel axle, and the further utilization of idler wheels 20 on the rear main power truck to allow the forward tapered end of the delta truck to be brought into close functional relationship to the main power frame 15 to again aid in shortening the locomotive, in turn, reflect back into the main portion of the delta truck so as to involve a motorized transom type delta truck. The complete combination of these various elements extending from the idle wheels 16 and 20 back into the construction and motorization of the delta truck has enabled me to produce a locomotive within allowable length requirements without sacrificing the weight carrying capacity of the various trucks and at the same time obtaining the desired maximum amount of axle motor capacity.

The foregoing combination presents the further problem of cooling particularly the delta truck motors 26 and to this end an improved air distributing arrangement is brought into cooperative relation to this delta truck by the provision of a chamber 41, here shown as located immediately above the articulated joint 25, arranged to be supplied with compressed air from a suitable source by way of a flexible bellows 42. Similar types of flexible bellows 43 and 44 respectively provide discharge outlets to supply ducts 45 and 46, the former of which leads to motor housings on the rear main power truck, while the latter takes care of the housings 26 on the trailer power truck in the same manner. Thus, the duct 46 extends medially above the housings 26 from the front end to the rear end of the truck frame 24, being supported at the latter end by bolted flanges 47. The respective housings 26 communicate with the duct 46 by means of lateral offsets 48 and flexible bellows 50. Thus, a continuous stream of cool compressed air is supplied to each motor housing 26 and maintains the motors cool with no danger of overheating. While the air supply has been described only in conjunction with the power driven trailer truck, it will be understood that the air supply duct is carried forward in like manner to cool the motors of the leading power truck or trucks.

From the disclosure herein, it will be seen that I have provided an improved combination of main power trucks and trailer truck whereby a locomotive of acceptable length is obtained combined with weight carrying capacity and maximum desired power notwithstanding the loss of power from the presence of idler axles. As a result of my improved combination I obtain not only these results but also others which will be apparent to those skilled in the art.

It will of course be understood that various changes in details of construction and arrangement of parts may be made by those skilled in the art without departing from the spirit of the invention as set forth in the appended claims.

I claim:

1. The combination in a locomotive of the type having an electric generator, comprising a main power truck having a plurality of motorized wheeled axles and an idle wheeled axle located behind the motorized axles, said truck including a frame overlying all of its wheeled axles and having an elongated portion extending rearwardly from the idle axle, a delta trailer truck having a plurality of motorized wheeled axles and being disposed beneath said rearwardly extending frame portion, a pivotal connection between said trucks located at the front end of the trailer truck on the center line thereof to support a part of the vertical power truck load, and vertical load supporting rocker connections between said rearwardly extending frame portion of the power truck and the trailer truck at two transversely spaced points of the latter at its other end.

2. The combination set forth in claim 1 further characterized in that the trailer truck has side frames, a transom, and an end sill, all rigidly connected together with one of its motorized axles located between said pivotal support and said transom and another of its motorized axles located between said transom and said end sill.

3. The combination set forth in claim 1 further characterized by the provision of an air duct mounted upon the main truck, another air duct mounted upon the trailer truck as a self-contained part thereof, means forming passages connecting said trailer and main truck ducts with said motors for circulating cooling air thereto, and flexible connecting means between the air duct of the main truck and the trailer truck duct, said pivotal support between the trailer truck and main truck being disposed substantially adjacent to the flexible connection between the ducts on the main truck and trailer truck, whereby the trailer truck duct may have a substantially rigid relation to the main truck duct throughout all pivotal movement of the trailer truck relative to the main truck.

JAMES C. MARIS.

REFERENCES CITED

The following references are of record in the file of this patent:

UNITED STATES PATENTS

| Number | Name | Date |
| --- | --- | --- |
| 708,462 | Cawley | Sept. 2, 1902 |
| 929,587 | Hanna | July 27, 1909 |
| 1,160,715 | Howell | Nov. 16, 1915 |
| 1,595,114 | Morgan | Aug. 10, 1926 |
| 1,615,454 | Ingersoll | Jan. 25, 1927 |
| 1,775,337 | Woodard | Sept. 9, 1930 |
| 1,842,973 | Kjolseth | Jan. 26, 1932 |